(12) United States Patent
Suzuki (10) Patent No.: US 9,394,000 B2
(45) Date of Patent: Jul. 19, 2016

(54) BODY FRAME CONNECTION MEMBER, AND BODY FRAME STRUCTURE

(71) Applicant: HINO MOTORS, LTD., Tokyo (JP)

(72) Inventor: Kenzo Suzuki, Hino (JP)

(73) Assignee: HINO MOTORS, LTD., Tokyo (JP)

( * ) Notice: Subject to any disclaimer, the term of this patent is extended or adjusted under 35 U.S.C. 154(b) by 0 days.

(21) Appl. No.: 14/347,838

(22) PCT Filed: Sep. 26, 2012

(86) PCT No.: PCT/JP2012/074649
§ 371 (c)(1),
(2) Date: Mar. 27, 2014

(87) PCT Pub. No.: WO2013/051439
PCT Pub. Date: Apr. 11, 2013

(65) Prior Publication Data
US 2014/0232144 A1    Aug. 21, 2014

(30) Foreign Application Priority Data

Oct. 5, 2011    (JP) .................................. 2011-220964

(51) Int. Cl.
*B62D 21/03*    (2006.01)
*B62D 21/02*    (2006.01)
(Continued)

(52) U.S. Cl.
CPC ................ *B62D 21/03* (2013.01); *B60G 9/003* (2013.01); *B62D 21/02* (2013.01); *B62D 21/09* (2013.01); *B60G 2204/43* (2013.01); *B60G 2300/38* (2013.01)

(58) Field of Classification Search
CPC ........ B05C 5/001; B05C 5/004; B05C 5/005; B32B 3/12; B60G 2204/43; B60G 2300/38; B60G 9/003; B62D 21/02; B62D 21/03; B62D 21/09; B60P 3/14; B60P 3/32; B60P 7/0807; B60P 7/0815; B60Y 2306/01; B62J 25/00
USPC ............. 296/191, 193.07, 211, 214; 118/600, 118/602, 324, 300
See application file for complete search history.

(56) References Cited

U.S. PATENT DOCUMENTS 2,111,563 A * 3/1938 Kliesrath ............... B62D 21/00
180/312
3,377,030 A * 4/1968 Swenson .............. A01C 15/006
239/656
(Continued)

FOREIGN PATENT DOCUMENTS

CN    101342918    1/2009
CN    201305031    9/2009
(Continued)

OTHER PUBLICATIONS

International Search Report prepared by the Japanese Patent Office on Nov. 6, 2012, for International Application No. PCT/JP2012/074649.
(Continued)

*Primary Examiner* — Glenn Dayoan
*Assistant Examiner* — Sunsurraye Westbrook
(74) *Attorney, Agent, or Firm* — Sheridan Ross P.C.

(57) ABSTRACT

A body frame connection member connects a first side frame portion and a second side frame portion which constitute each side frame. The body frame connection member is provided with a mount surface, an opposite-side surface, and a reinforcing rib. The mount surface is configured such that a loading platform can be mounted thereon, and includes an outer-side edge. The opposite-side surface is facing the opposite side from the mount surface, and is a recessed surface recessed toward the mount surface. The reinforcing rib extends upward from the outer-side edge of the mount surface.

11 Claims, 4 Drawing Sheets

(51) Int. Cl.
*B62D 21/09* (2006.01)
*B60G 9/00* (2006.01)

(56) References Cited

U.S. PATENT DOCUMENTS

| | | | | |
|---|---|---|---|---|
| 4,402,545 | A * | 9/1983 | Utsunomiya | B62D 25/2072 296/770 |
| 4,878,691 | A * | 11/1989 | Cooper | B60G 11/27 280/124.128 |
| 5,433,287 | A * | 7/1995 | Szalai | B60G 9/00 180/353 |
| 7,055,895 | B1 * | 6/2006 | King | B62D 25/2072 280/770 |
| 7,540,343 | B2 * | 6/2009 | Nakashima | B60K 1/00 180/65.1 |
| 2005/0194817 | A1 | 9/2005 | Osato et al. | |
| 2010/0264699 | A1 * | 10/2010 | Wang | B62D 25/2036 296/193.07 |
| 2010/0327628 | A1 * | 12/2010 | Taguchi | B60K 15/06 296/193.07 |

FOREIGN PATENT DOCUMENTS

| | | |
|---|---|---|
| CN | 101602379 | 12/2009 |
| CN | 101987634 | 3/2011 |
| CN | 201872800 | 6/2011 |
| JP | 39-22607 Y | 8/1964 |
| JP | S63-98873 | 6/1988 |
| JP | S63-142275 | 9/1988 |
| JP | H09-328079 | 12/1997 |
| JP | 10-338161 A | 12/1998 |
| JP | 11-278308 | 10/1999 |
| JP | 2000-344129 | 12/2000 |
| JP | 2002-331958 | 11/2002 |
| JP | 2005-219581 | 8/2005 |
| JP | 2006-56445 A | 3/2006 |

OTHER PUBLICATIONS

English Translation of International Preliminary Report on Patentability for International (PCT) Patent Application No. PCT/JP2012/074649, issued May 20, 2014, 4 pages.
Official Action for Japan Patent Application No. 2011-220964, dated Jun. 2, 2015, 2 pages.
Extended Search Report for European Patent Application No. 12838964.0, dated Aug. 13, 2015, 6 pages.
Official Action with English Translation for China Patent Application No. 201280048644.7, dated Jul. 27, 2015, 12 pages.

* cited by examiner

BODY FRAME CONNECTION MEMBER, AND BODY FRAME STRUCTURE

CROSS-REFERENCE TO RELATED APPLICATIONS

This application is a national stage application under 35 U.S.C. 371 and claims the benefit of PCT Application No. PCT/JP2012/074649 filed 26 Sep. 2012 which designated the United States, which PCT Application claimed the benefit of Japanese Patent Application No. 2011-220964 filed on Oct. 5, 2011, the disclosure of each of which are incorporated herein by reference.

TECHNICAL FIELD

The present invention relates to a vehicle body frame connection member that forms a vehicle body frame, and more particularly, to a vehicle body frame connection member that forms a vehicle body frame for a truck on which a cargo bed is mounted, and a vehicle body frame structure including the vehicle body frame connection member.

BACKGROUND ART

In the prior art, a structure that increases convenience when entering and exiting a transit bus by eliminating steps from the entrance or exit has been proposed for a transit bus vehicle body frame. For example, patent document 1 describes a vehicle body frame including a side frame divided into a rear frame, which is located above the rear wheels, and a front frame, which is located in front of the rear wheels. The front frame is placed at a lower position than the rear frame. Then, a connection member connects the frames to each other. This eliminates the need for steps at the entrance or exit.

Recent trucks on which cargo beds are mounted also have lowered cargo beds so that more cargo can be carried within the specified size. A known side frame of a vehicle body frame for such a truck is an integrally casted frame curved near the axle to avoid the movable range of the axle.

PRIOR ART DOCUMENT

Patent Document

Patent Document 1: Japanese Laid-Open Patent Publication No. 2006-56445

SUMMARY OF THE INVENTION

In a side frame including a curved portion that projects toward the cargo bed as described above, the wheel well formed in the cargo bed needs to be large enough to accommodate the curved portion of the side frame in addition to the wheels. In the structure of the cargo bed, the size of the curved portion of the side frame enlarges the wheel wells toward the inner side of the cargo bed. As a result, although the lowered cargo bed increases the cargo capacity, in comparison to when the wheel wells accommodate only the wheels, the cargo capacity of the cargo bed is small. Thus, there is still room for improvement with regard to increasing the cargo capacity.

It is an object of the present invention to provide a vehicle body frame connection member and a vehicle body frame structure that allows for an increase in the cargo capacity of a lowered cargo bed.

To achieve the above object, one aspect of the present invention is a vehicle body frame connection member arranged on each of two side frames that are parallel to each other. The vehicle body frame connection member connects a first side frame portion and a second side frame portion of each side frame in a direction in which the side frame extends. The vehicle body frame connection member of each side frame includes an inner portion facing toward the other side frame and an outer portion facing away from the other side frame. The vehicle body frame connection member includes a setting surface formed so that a cargo bed is set thereon. The setting surface includes an outer edge corresponding to the outer portion. An opposite surface faces an opposite side of the setting surface. The opposite surface is a recessed surface recessed toward the setting surface. A reinforcement rib projects from the outer edge of the setting surface.

A further aspect of the present invention is a vehicle body frame structure including two side frames that are parallel to each other. Each side frame includes a first side frame portion and a second side frame portion. A vehicle body frame connection member connects the first side frame portion and the second side frame portion in a direction in which the side frame extends. The vehicle body frame connection member of each side frame includes an inner portion facing toward the other side frame and an outer portion facing away from the other side frame. The vehicle body frame connection member includes a setting surface formed so that a cargo bed is set thereon. The setting surface includes an outer edge corresponding to the outer portion. An opposite surface faces an opposite side of the setting surface. The opposite surface is a recessed surface recessed toward the setting surface. A reinforcement rib projects from the outer edge of the setting surface.

In one aspect of the present invention, the opposite surface facing the opposite side of the setting surface on which the cargo bed is set is a recessed surface that is recessed toward the setting surface. This allows for the arrangement of the vehicle body frame in which the opposite surface and the axle are faced toward each other. In such an arrangement, in a portion of the opposite surface recessed toward the setting surface, the axle, which faces toward the portion, is allowed to move toward the setting surface. Thus, the recessed surface of the opposite surface allows for movement of the axle to a position proximal to the setting surface. Consequently, the cargo bed, which is set on the setting surface, may be lowered.

In the vehicle body frame connection member, the opposite surface is recessed toward the setting surface. Thus, the formation of the recessed surface may lower the mechanical strength of the vehicle body frame connection member. In this respect, in one aspect of the present invention, the reinforcement rib projects from the outer edge of the setting surface. This increases the mechanical strength of the vehicle body frame connection member in comparison to when there is no reinforcement rib. In addition, the vehicle body frame connection member of each side frame includes the inner portion that faces toward the other side frame and the outer portion that faces away from the other side frame. The setting surface includes the outer edge that corresponds to the outer portion, and the reinforcement rib projects from the outer edge. This allows for substantially the entire setting surface to be used as a setting portion for the cargo bed. Further, the reinforcement rib may be used to position the cargo bed mounted on the vehicle body frame, and sideward displacement of the mounted cargo bed may be limited.

Preferably, in the outer edge of the setting surface, a height of the reinforcement rib from the setting surface is greatest at a location where the distance is smallest between the setting surface and the opposite surface.

The opposite surface is formed as a recessed surface, which is recessed toward the setting surface. Thus, in comparison to a structure in which the setting surface and the opposite surface are parallel to each other, the distance is decreased between the opposite surface and the setting surface. Further, in the outer edge of the setting surface where the reinforcement rib is arranged, the mechanical strength of the vehicle body frame connection member has a tendency of being lower at the portion where the distance is smallest between the setting surface and the opposite surface compared to other portions.

In this respect, in the above embodiment, the height of the reinforcement rib increases at the portion where the distance is smallest between the setting surface and the opposite surface. This allows for a limited increase in the height of the reinforcement rib from the setting surface when reinforcing mechanical strength.

Preferably, the opposite surface is an inwardly curved surface, and the height of the reinforcement rib from the setting surface increases as the distance decreases between the setting surface and the opposite surface.

In the above aspect, at locations along the outer edge of the setting surface, the height of the reinforcement rib from the setting surface increases as the distance decreases between the setting surface and the opposite surface. This allows for the height of the reinforcement rib from the setting surface to be suitable for reinforcing the mechanical strength with the reinforcement rib.

Preferably, the vehicle body frame connection member is a casting, and includes a first fastening portion, fastened to the first side frame portion by a fastening member, and a second fastening portion, fastened to the second side frame portion by a fastening member.

Generally, to allow for satisfactory welding to another member, there are many limitations to the components that may be contained in a casting. In the above aspect, the vehicle body frame connection member includes the first and second fastening portions, which are fastened by fastening members to the first and second side frames. Thus, when connecting the vehicle body frame connection member, which is a casting, to the first and second side frames, there are no restrictions to the degree of freedom for the components contained in the connection member.

DETAILED DESCRIPTION OF THE PREFERRED EMBODIMENTS

One embodiment of a vehicle body frame connection member and a vehicle body frame structure according to the present embodiment will now be described with reference to FIGS. 1 to 5.

Figure 1:
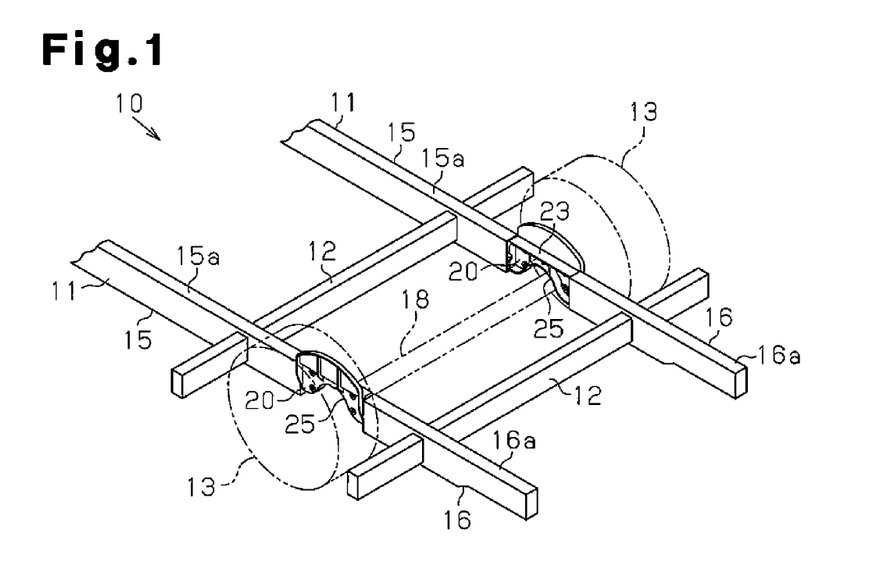
FIG. 1 is a perspective view showing a vehicle body frame structure according to one embodiment of the present invention.

Referring to FIG. 1, a vehicle body frame 10 of a vehicle on which a cargo bed 61 is mounted includes two side frames 11, a left one and a right one extending in the front to rear direction of the vehicle, and a plurality of cross-members, which have the form of hollow tetragonal posts and connect the two side frames 11 in the widthwise direction of the vehicle. The cargo bed 61 is set and positioned on the upper surfaces of the two side frames 11 and then fixed to the vehicle body frame 10.

The side frame 11 includes a front frame portion 15, which has the form of a hollow tetragonal post and serves as a first side frame portion arranged toward the front of the vehicle from a rear wheel 13 of the vehicle, and a rear frame portion 16, which has the form of a hollow tetragonal post and serves as a second side frame portion arranged toward the rear of the vehicle from the rear wheel 13. Further, the side frame 11 includes a connection member 20 that connects the front frame portion 15 and the rear frame portion 16 and is located above an axle 18, which connects the left and right rear wheels 13 to each other.

The connection member 20 is connected to the front frame portion 15 and the rear frame portion 16 so that an upper surface 15a of the front frame portion 15 is flush with an upper surface 16a of the rear frame portion 16. Further, the connection member 20 includes a setting surface 23 formed to allow for mounting of the cargo bed 61 shown in FIG. 5 and connect the upper surface 15a of the front frame portion 15 and the upper surface 16a of the rear frame portion 16 so that the upper surfaces 15a and 16a form a continuous flat surface.

Figure 2:
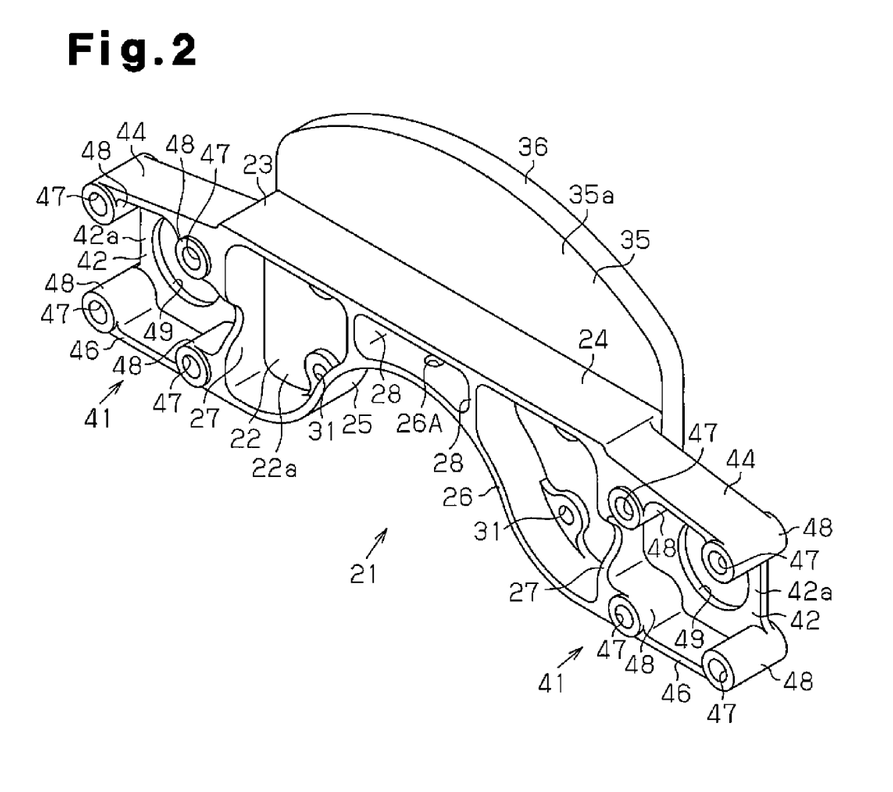
FIG. 2 is a perspective view showing a connection member of FIG. 1, in particular, a portion facing the inner side of a vehicle.
Figure 3:
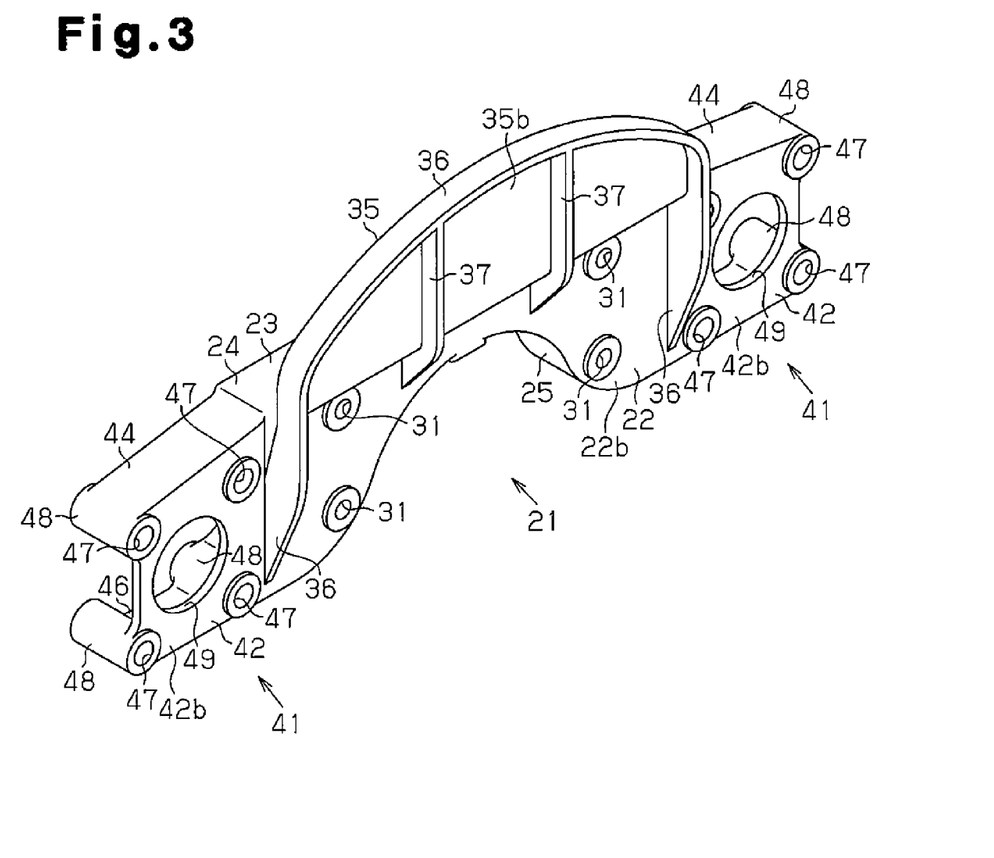
FIG. 3 is a perspective view showing a connection member of FIG. 1, in particular, a portion facing the outer side of the vehicle.

Referring to FIGS. 2 and 3, the connection member 20 is a casting having reflective symmetry relative to a central surface in the front to rear direction of the vehicle. An interposing portion 21, which is located between the front frame portion 15 and the rear frame portion 16, is formed integrally with two fastening portions 41, which are located at the two sides of the interposing portion 21 in the front to rear direction of the vehicle and fastened to the front frame portion 15 or the rear frame portion 16 by fasteners such as bolts and nuts. Among the two fastening portions 41, the fastening portion 41 fastened to the front frame portion 15 serves as a first fastening portion, and the fastening portion 41 fastened to the rear frame portion 16 serves as a second fastening portion. Further, the connection member 20 of each side frame 11 includes an inner portion facing toward the other side frame 11 and an outer portion facing away from the other side frame 11.

An interposing base plate 22, which forms the interposing portion 21, is flat and extends in the front to rear direction of the vehicle. The interposing base plate 22 is arranged so that its inner surface 22a faces toward an inner side of the vehicle and its outer surface 22b faces toward an outer side of the vehicle. The interposing base plate 22 includes an upper edge extending straight in the front to rear direction of the vehicle and a lower edge curved so that the central portion in the front to rear direction of the vehicle is near the upper end.

An upper wall 24 extends along the upper edge and projects from the inner surface 22a of the interposing base plate 22. The upper wall 24 includes the setting surface 23. A lower wall 26 extends along the lower edge and projects from the inner surface 22a. The lower wall 26 includes a recessed surface 25, which is an inwardly curved surface and served as an opposite surface to the setting surface 23. The curved lower wall 26 includes a peak through which a threaded portion 26a extends. A bump stopper 60 is connected to the threaded portion 26A. Two side walls 27 project from the inner surface 22a to connect the ends of the upper wall 24 and the ends of the lower wall 26 to each other. A central portion of each of the two side walls 27 between the upper wall 24 and the lower wall 26 are curved toward the interposing base plate 22. Two vertical ribs 28 connecting the upper wall 24 and the lower wall 26 are arranged at the inner side of the two side walls 27 in the front to rear direction of the vehicle.

Two threaded portions 31 are formed in the vicinity of each of the two fastening portions 41 in a location surrounded by the upper wall 24, the lower wall 26, the side wall 27, and the vertical rib 28. The fastening portions 41 are for fastening an upper bracket 58 that supports a shock absorber 57.

A flat reinforcement rib 35 upwardly extends from an edge at the side of the setting surface 23 corresponding to the outer surface 22b of the interposing base plate 22 (outer edge corresponding to the outer portion). The reinforcement rib 35 includes an upper edge that is curved so that the height from the setting surface 23 increases as the central portion in the front to rear direction of the vehicle becomes closer. More specifically, the upper edge of the reinforcement rib 35 is curved so that the height from the setting surface 23 increases as the distance between the setting surface 23 and the recessed surface 25 decreases at locations along the outer edge of the setting surface.

Further, the reinforcement rib 35 is formed so that an inner surface 35a of the reinforcement rib 35 is orthogonal to the setting surface 23 of the upper wall 24 and so that the inner surface 35a of the reinforcement rib 35 is arranged toward the outer side of the vehicle from the frame portions 15 and 16.

A peripheral wall 36 projects from an outer surface 35b of the reinforcement rib 35 and extends along the upper edge and side edges of the reinforcement rib 35. The peripheral wall 36 extends to the outer surface 22b of the interposing base plate 22 at the side edges of the reinforcement rib 35 to as to fill the step between the outer surface 35b of the reinforcement rib 35 and the outer surface 22b of the interposing base plate 22. Two vertical ribs 37, which downwardly extend from the peripheral wall 36, project from the outer surface 35b of the reinforcement rib 35 at locations in the outer surface 35b corresponding to where the vertical ribs 28 are arranged on the inner surface 22a of the interposing base plate 22. The vertical ribs 37 extend to the outer surface 22b of the interposing base plate 22 to fill the step between the outer surface 35b of the reinforcement rib 35 and the outer surface 22b of the interposing base plate 22.

Fastening base plates 42, which form the fastening portions 41 formed integrally with the two sides of the interposing portion 21 in the front to rear direction of the vehicle, are continuous with the interposing base plate 22. Each fastening base plate 42 is a rectangular plate that is inclined so that the upper edge of the fastening base plate 42 becomes closer to the lower edge at locations farther from the interposing base plate 22.

An upper wall 44, which is continuous with the upper wall 24 of the interposing portion 21, extends along the upper edge of the fastening base plate 42 and projects from an inner surface 42a of the fastening base plate 42. Further, a lower wall 46, which is continuous with the lower wall 26 of the interposing portion 21, extends along the lower edge of the fastening base plate 42 and projects from the inner surface 42a. A bolt insertion portion 48, including an insertion hole 47, projects from each corner in the inner surface 42a of the fastening base plate 42. Bolts are inserted through the insertion holes 47 to fasten the connection member 20 to the frame portions 15 and 16. A circular through hole 49 is formed in a central portion of the rectangular and flat fastening base plate 42.

The operation of the vehicle body frame 10 including the connection member 20 will now be described with reference to FIGS. 4 and 5.

Figure 4:
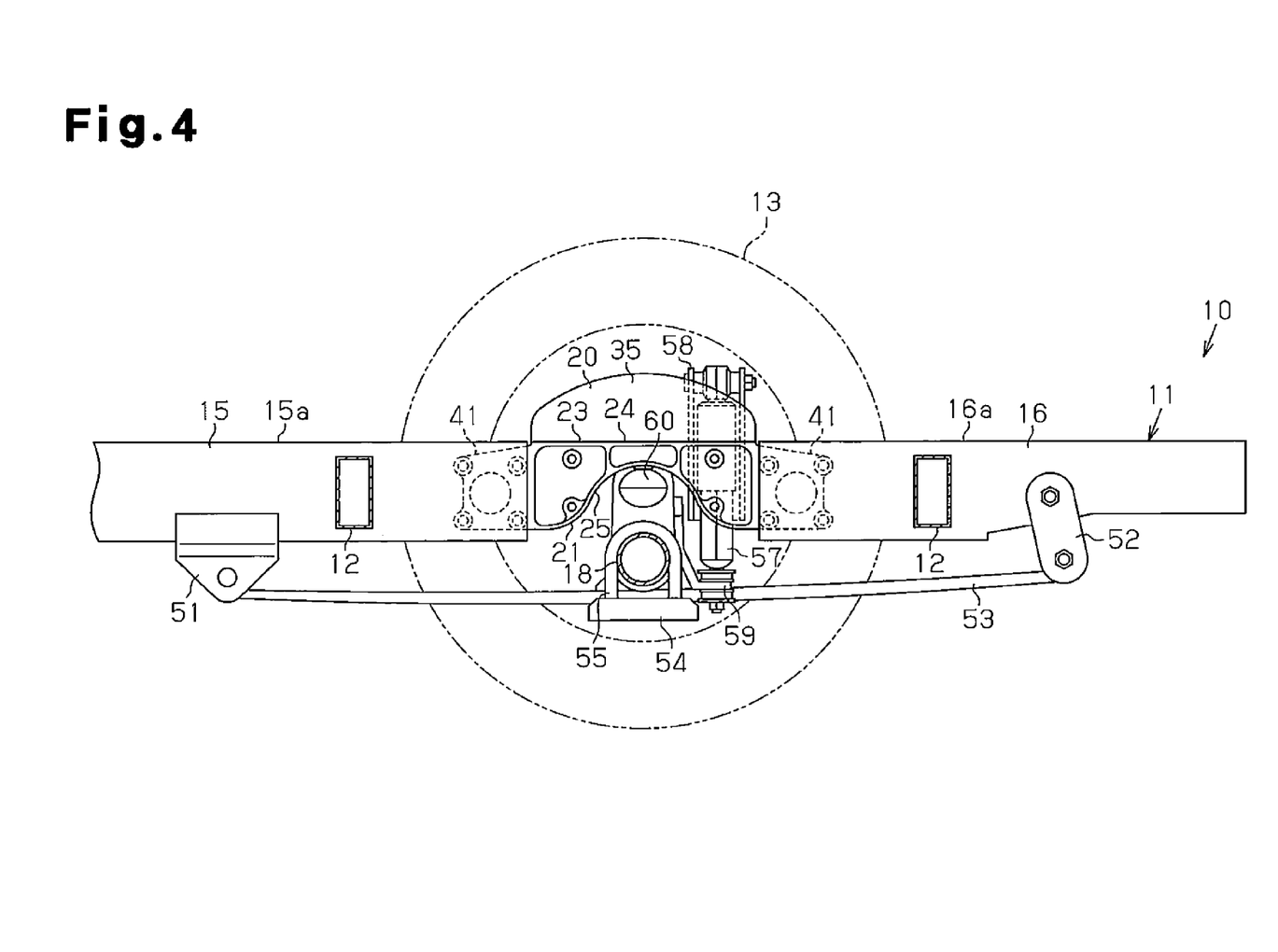
FIG. 4 is a view showing a vehicle structure near the connection member at the inner side of a side frame of FIG. 1.

As shown in FIG. 4, the connection member 20 is fastened to the front frame portion 15 by fastening members (not shown) under a situation in which one of the fastening portions 41 is received in the front frame portion 15. Further, the connection member 20 is fastened to the rear frame portion 16 by fastening members (not shown) under a situation in which the other fastening portion 41 is received in the rear frame portion 16. The connection member 20 is arranged above the axle 18 that extends in the widthwise direction of the vehicle and connects the left and right rear wheels 13.

A spring bracket 51 is fixed to the front frame portion 15. A shackle 52 is connected to the rear frame portion 16 and pivotal in the front to rear direction of the vehicle. A leaf spring 53 extends between the spring bracket 51 and the shackle 52. When the leaf spring 53 is held between the axle 18 and a U-bolt seat 54, a U-bolt 55 is connected to the U-bolt seat 54.

Further, the shock absorber 57 is arranged in an area between the side frame 11 and the rear wheel 13. An upper bracket 58 and a lower bracket 59 support the shock absorber 57. The upper bracket 58 is fixed to the two threaded portions 31 located near the rear frame portion 16 in the connection member 20. The lower bracket 59 is fixed to the axle 18. Thus, the axle 18 vertically moves relative to the side frame 11 while the leaf spring 53 and the shock absorber 57 absorb vibration of the rear wheel 13 produced in accordance with the road surface along which the vehicle is driven.

The connection member 20, which is located above the axle 18, includes the recessed surface 25, which is curved toward the upper surface of the side frame 11. This allows the area surrounded by the recessed surface 25 to serve as a portion of the movable range of the axle 18. Thus, the upper surface 15a of the front frame portion 15, the upper surface 16a of the rear frame portion 16, and the upper surface of the side frame 11 that is a flat surface formed by the setting surface 23 of the connection member 20 may be arranged closer to the axle 18. The bump stopper 60 is connected to the threaded portion 26A formed in the lower wall 26 of the connection member 20.

Figure 5:
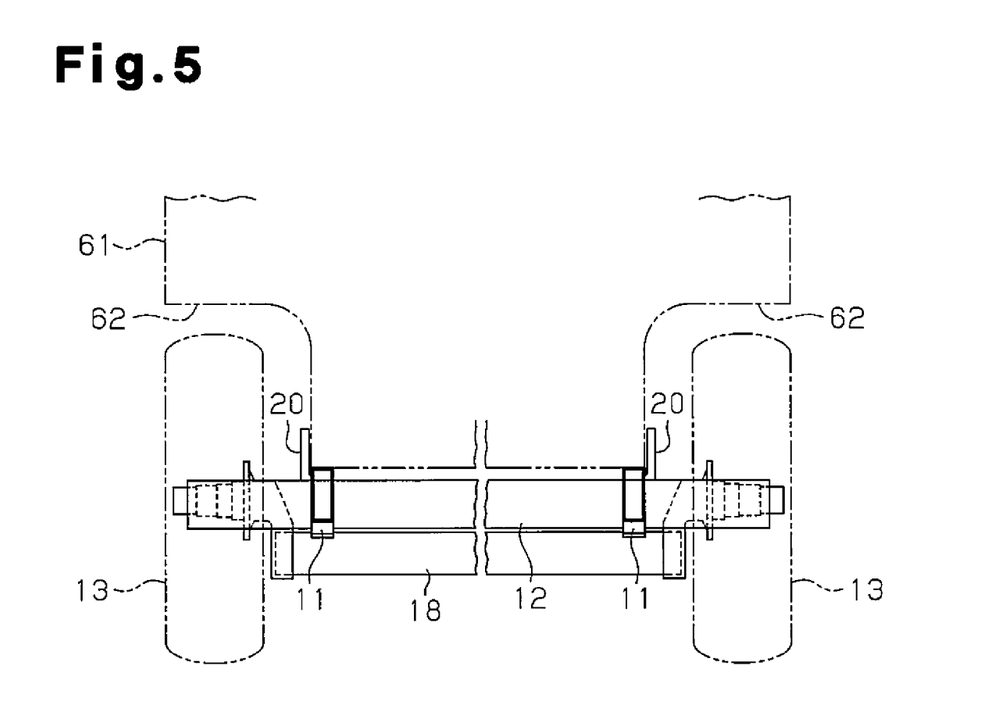
FIG. 5 is a schematic view showing a cargo bend mounted on the vehicle body frame of FIG. 1.

Further, as shown in FIG. 5, the upper surface of the side frame 11 is flat. Thus, the cargo bed 61 mounted on the vehicle body frame 10 includes a wheel well 62 that is large enough to accommodate the rear wheel 13.

As described above, the vehicle body frame 10 includes the advantages listed below.

(1) The connection member 20, which connects the front frame portion 15 and the rear frame portion 16, is located above the axle 18, which connects the left and right rear wheels 13, and includes the recessed surface 25, which is recessed toward the setting surface 23 and away from the axle 18. Further, the connection member 20 includes the setting surface 23 that connects the upper surface 15a of the front frame portion 15 and the upper surface 16a of the rear frame portion 16 to form a continuous flat surface.

This allows the area surrounded by the recessed surface 25 to serve as a portion of the movable range for the axle 18. Thus, the upper surface of the side frame 11 may be arranged closer to the axle 18. As a result, the cargo bed 61, which is mounted on the vehicle body frame 10, may be lowered. Further, due to the flat upper surface of the side frame 11, which includes the front frame portion 15, the rear frame portion 16, and the connection member 20, the wheel well 62 only needs to be large enough to accommodate the rear wheel 13 in the cargo bed 61 mounted on the vehicle body frame 10.

Thus, compared to when accommodating a portion of the side frame 11 in addition to the rear wheel 13, the cargo capacity of the cargo bed 61 between the wheel wells 62 may be increased. Consequently, the cargo capacity of the lowered cargo bed 61 may be further increased.

(2) The lengths of the front frame portion 15 and the rear frame portion 16 may be freely set based on the connection member 20, which is located above the axle 18. Thus, in comparison with an integrally cast side frame, the degree of freedom for the side frame length is improved.

(3) The interposing portion 21 of the connection member 20 includes the reinforcement rib 35, which is arranged toward the outer side of the vehicle from the front frame portion 15 and the rear frame portion 16 and which upwardly projects from an outer edge of the setting surface 23. Thus, in addition to increasing the mechanical strength of the interposing portion 21, the reinforcement rib 35 may be used as a positioning member for the cargo bed 61 that is mounted on the vehicle body frame 10 so that displacement of the cargo bed 61 when mounted on the vehicle body frame 10 is limited in the widthwise direction of the vehicle.

(4) In a connection member that does not include the reinforcement rib 35, the mechanical strength easily decreases as the distance between the setting surface 23 and the recessed surface 25 decreases at locations along the outer edge of a setting surface. In this regard, the height of the reinforcement rib 35 from the setting surface 23 increases as the length of the interposing base plate 22 in the vertical direction at locations along the outer edge of the setting surface 23 decreases, that is, as the distance between the setting surface 23 and the recessed surface 25 decreases. As a result, the mechanical strength may be effectively compensated for at locations where the mechanical strength tends to decrease due to the formation of the recessed surface 25 in the connection member 20.

(5) Generally, to allow for satisfactory welding to another member, there are many limitations to the components that may be contained in a casting. In this respect, in the present embodiment, the connection member 20, which is a casting, includes the fastening portions 41, which are fastened by fastening members such as bolts and nuts to the front frame portion 15 and the rear frame portion 16. Thus, when connecting the connection member 20, which is a casting, to the front frame portion 15 and the rear frame portion 16, there are no restrictions to the degree of freedom for the components contained in the connection member 20.

(6) When fastening the fastening portions 41 to the frame portions 15 and 16 with fastening members, the tightening of the fastening members applies stress to the fastening base plates 42. However, the through hole 49, which is formed in the central portion of the fastening base plate 42 allows for the stress to be dispersed.

The above embodiment may be modified as described below.

The connection member is not limited to a casting and may be formed by welding, for example, a plurality of steel materials. In this manner, the connection member 20 only needs the setting surface 23, which connects the upper surface 15a of the front frame portion 15 and the upper surface 16a of the rear frame portion 16 so that the upper surfaces 15a and 16a form a continuous flat surface, and the recessed surface, which forms a movable area for the axle 18. Further, the method for manufacturing the connection member 20 is not limited to casting.

The method for connecting the connection member to the front frame portion 15 and the rear frame portion 16 is not restricted to the fastening method using fastening members and may be a method that performs welding or the like for the connection.

The reinforcement rib 35 may have a height from the setting surface 23 that is constant, for example. In other words, the height of the reinforcement rib 35 from the setting surface 23 may be specified regardless of the distance between the setting surface 23 and the recessed surface 25.

The lower edge of the interposing base plate 22 only needs to be recessed toward the upper edge at a central portion in the front to rear direction of the vehicle and does not have to be curved. That is, the recessed surface does not have to be an inwardly curved surface and only needs to be recessed toward the setting surface 23. For example, the recessed surface may be formed by a plurality of flat surfaces.

The upper bracket 58, which supports the shock absorber 57, may be fixed to the front frame portion 15 or the rear frame portion 16 instead of the connection member 20. Such a structure allows for the threaded portion 31 to be omitted from the connection member 20.

The invention claimed is:

1. A vehicle body frame connection member arranged on each of two side frames that are parallel to each other, wherein the vehicle body frame connection member connects a first side frame portion and a second side frame portion of each side frame in a direction in which the side frame extends, the vehicle body frame connection member of each side frame includes an inner portion facing toward the other side frame and an outer portion facing away from the other side frame, the vehicle body frame connection member comprising:
    a setting surface formed so that a cargo bed is set thereon, wherein the setting surface includes an outer edge corresponding to the outer portion;
    an opposite surface facing an opposite side of the setting surface, wherein the opposite surface is a recessed surface recessed toward the setting surface; and
    a reinforcement rib projecting from the outer edge of the setting surface.

2. The vehicle body frame connection member according to claim 1, wherein in the outer edge of the setting surface, a height of the reinforcement rib from the setting surface is greatest at a location where the distance is smallest between the setting surface and the opposite surface.

3. The vehicle body frame connection member according to claim 2, wherein
    the opposite surface is an inwardly curved surface, and
    the height of the reinforcement rib from the setting surface increases as the distance decreases between the setting surface and the opposite surface.

4. The vehicle body frame connection member according to claim 1, wherein
    the vehicle body frame connection member is a casting, and includes a first fastening portion, fastened to the first side frame portion by a fastening member, and a second fastening portion, fastened to the second side frame portion by a fastening member.

5. The vehicle body frame connection member according to claim 1, wherein the first side frame portion and the second side frame portion are separated from each other with a clearance formed in between;
    the vehicle body frame connection member is arranged in the clearance; and
    the vehicle body frame connection member connects the first side frame portion and the second side frame portion in a longitudinal direction of the side frame.

6. The vehicle body frame connection member according to claim 1, wherein the first side frame portion and the second side frame portion each include an upper surface that is flush with the setting surface.

7. The vehicle body frame connection member according to claim 1, wherein the reinforcement rib include an upper surface that does not overlap the setting surface.

8. A vehicle body frame structure comprising:
two side frames that are parallel to each other, wherein each side frame includes a first side frame portion and a second side frame portion;
a vehicle body frame connection member that connects the first side frame portion and the second side frame portion in a direction in which the side frame extends, wherein the vehicle body frame connection member of each side frame includes an inner portion facing toward the other side frame and an outer portion facing away from the other side frame, the vehicle body frame connection member including
a setting surface formed so that a cargo bed is set thereon, wherein the setting surface includes an outer edge corresponding to the outer portion,
an opposite surface facing an opposite side of the setting surface, wherein the opposite surface is a recessed surface recessed toward the setting surface, and
a reinforcement rib projecting from the outer edge of the setting surface.

9. The vehicle body frame structure according to claim 8, wherein the first side frame portion and the second side frame portion are separated from each other with a clearance formed in between;
the vehicle body frame connection member is arranged in the clearance; and
the vehicle body frame connection member connects the first side frame portion and the second side frame portion in a longitudinal direction of the side frame.

10. The vehicle body frame connection member according to claim 5, wherein the first side frame portion and the second side frame portion each include an upper surface that is flush with the setting surface.

11. The vehicle body frame connection member according to claim 8, wherein the reinforcement rib includes an upper surface that does not overlap the setting surface.

* * * * *